W. PASSARELLA.
SLED RUNNER ATTACHMENT FOR VEHICLES.
APPLICATION FILED DEC. 7, 1911.
1,065,832.
Patented June 24, 1913.
3 SHEETS—SHEET 3.
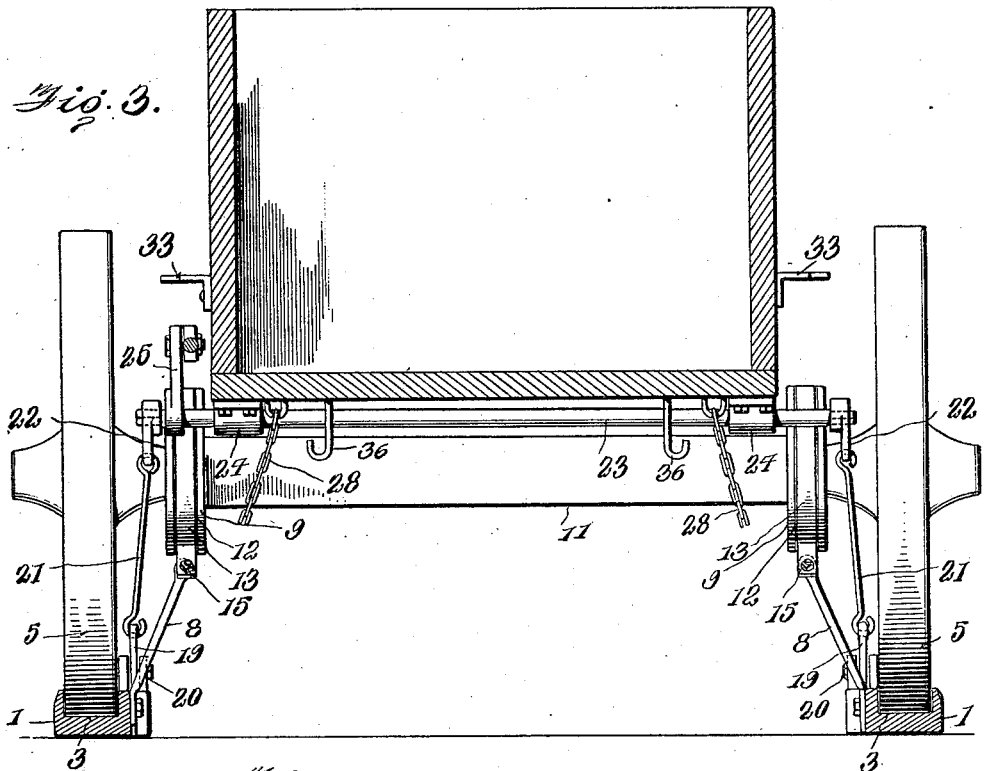
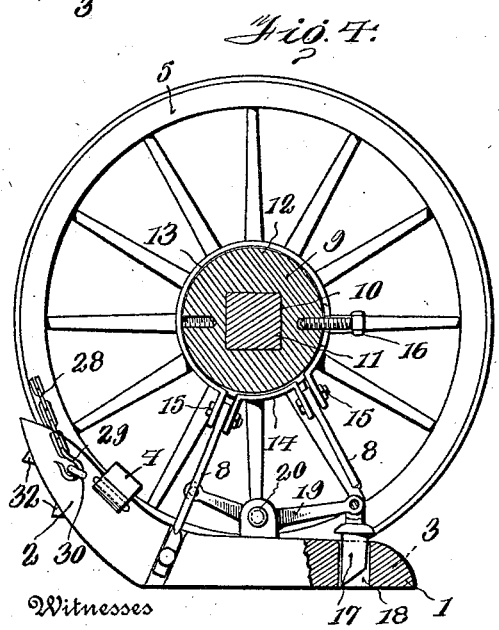

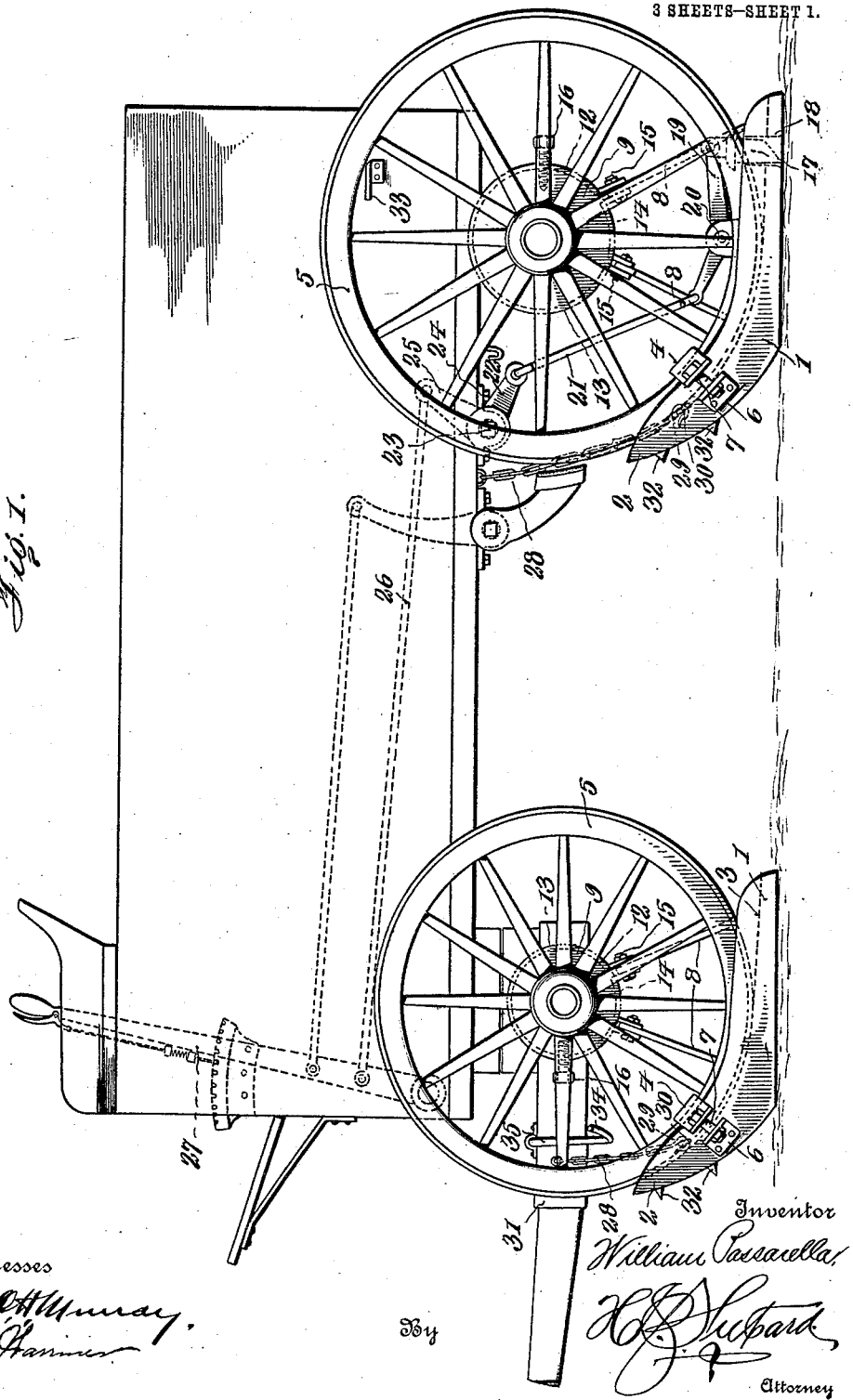

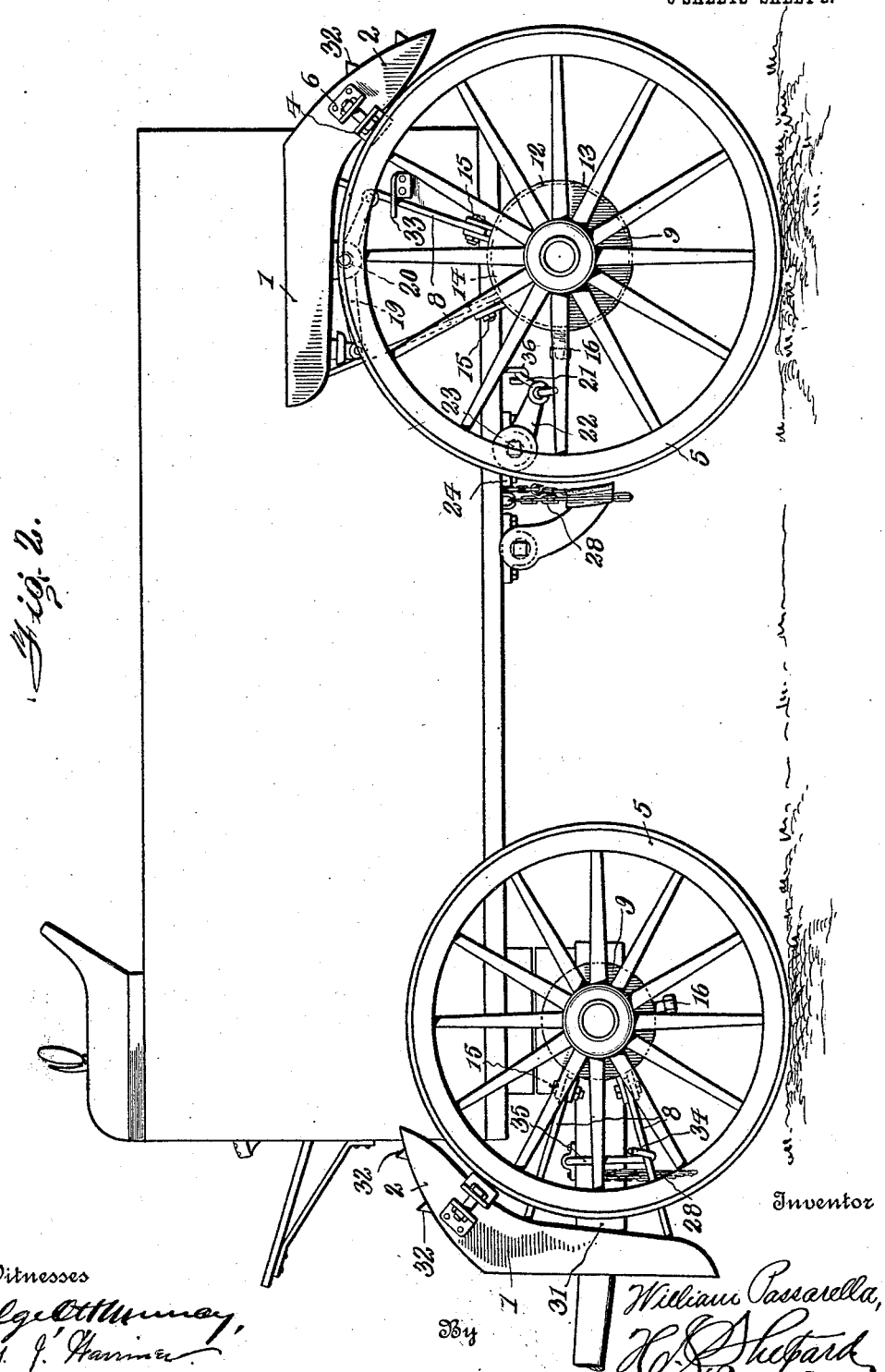

UNITED STATES PATENT OFFICE.

WILLIAM PASSARELLA, OF MILNESVILLE, PENNSYLVANIA.

SLED-RUNNER ATTACHMENT FOR VEHICLES.

1,065,832.  Specification of Letters Patent.  Patented June 24, 1913.

Application filed December 7, 1911.  Serial No. 664,445.

*To all whom it may concern:*

Be it known that I, WILLIAM PASSARELLA, a citizen of the United States, residing at Milnesville, in the county of Luzerne and State of Pennsylvania, have invented certain new and useful Improvements in Sled-Runner Attachments for Vehicles, of which the following is a specification.

This invention relates to sled runners for vehicles.

An object of the present invention is to embody the same in the form of wheel runners, and to enable the convenient attachment and removal of the runners without removing the wheels of the vehicle.

A further object of the invention is to mount the runners in such a manner as to permit of their convenient adjustment from an operative position into an inoperative position, and to hold them in an inoperative position without interfering with the rotation of the wheels and the usual running of the vehicle. The front runners are so arranged, in their inoperative position, that the front axle may be turned in the usual manner to guide the wagon without interference on the part of the runners. It is also proposed to equip the device with a brake adapted to engage the roadway and also to provide for the convenient operation of the brake.

With these and other objects in view, the present invention consists in the combination and arrangement of parts as will be hereinafter fully described, shown in the accompanying drawings and particularly pointed out in the appended claims, it being understood that changes in the form, proportion, size and minor details may be made within the scope of the claims, without departing from the spirit of the present invention.

In the drawings,—Figure 1 is a side view of a vehicle equipped with sled runners of the present invention, the runners being in operative position. Fig. 2 is a similar view showing the runners adjusted to their inoperative position. Fig. 3 is a cross sectional view looking toward the rear of the vehicle. Fig. 4 is a detail sectional view taken through the rear axle and looking at one of the wheels, a portion of the runner being broken away to show the brake plunger. Fig. 5 is a detail perspective view of one of the rear runners. Fig. 6 is a detail cross sectional view taken through the rim of one of the wheels and the runner thereof.

Like characters of reference indicate corresponding parts in each of the figures of the drawings.

In the present embodiment of this invention, there is a pair of runners for the front wheels and a pair of runners for the rear wheels, the front and rear runners being duplicates, except that the rear runners are provided with brakes to engage the roadway, and therefore a description in detail of one of the runners will serve for all of the runners.

Each runner 1 is in the form of a shoe having a flat straight bottom to engage the roadway and having its forward end 2 rounded or bowed upwardly. In the top of each runner there is a longitudinal seat or groove 3 which extends throughout the length of the runner and is open at its rear end. A swinging clip 4 is suitably hinged to the upturned front end portion of the runner upon the inner side thereof, and designed to extend across the rim of the vehicle wheel 5 with its free end connected to an ear 6 provided upon the outer side of the runner. For connecting the free end of the clip to the ear there is provided a suitable fastening, such for instance as a bolt or screw 7. A pair of arms or braces 8 are secured to the inner side of the runner and extend upwardly therefrom. These braces are connected to the adjacent axle so as to hold the runner in place and thereby prevent the wheel from rotating and carrying the runner around with it.

For the purpose of connecting the braces to the axle there is provided a circular head 9 having a square or non-circular central opening 10 which snugly receives the non-circular portion of the axle 11 at the inner end of the spindle thereof, so as to prevent turning of the head on the axle. Extending around the periphery of this head is a circular groove or channel 12 in which is fitted a band preferably made up of a long section 13 and a short section 14. The upper end of each brace 8 is received between the adjacent ends of the band sections, and a bolt 15 is passed through these parts so as to hold them together. To prevent rotation or creeping of the band on the head, there is a set screw 16 extending through the long band section and into a threaded opening in the head.

Each of the rear runners is provided with a brake including a plunger 17 working vertically through an opening 18 formed in the rear portion of the runner, said rear portion of the runner being enlarged laterally to accommodate the brake plunger. This brake plunger is pivotally connected to one end of an angle or bell-crank lever 19, fulcrumed intermediate of its ends, as at 20, upon the top of the runner. A link 21 extends upwardly and forwardly from the front of the lever and is connected to a crank arm 22 carried by the adjacent end of a rock bar 23 mounted in suitable bearings 24 upon the vehicle. At the inner side of the crank arm 22 is another crank arm 25, which is set at an angle to the crank arm 22. A connecting rod 26 extends from the crank arm 25 forwardly to a hand lever 27 mounted upon the vehicle in position for convenient access by the driver. If desired, the hand lever 27 may be the hand lever of an ordinary vehicle brake such as illustrated in the accompanying drawing and which needs no detail description.

While not absolutely necessary I prefer to provide each runner with an additional brace or safety device in the form of a chain 28 connected to the vehicle and provided at its lower end with a hook 29 to engage with an eye 30 provided upon the inner side of the upturned front end of the adjacent runner. The chains for the front runners are connected to the vehicle tongue or pole 31 so as not to interfere with the turning of the front axle in guiding the vehicle.

Across the under side of the upturned front portion of each runner are a number of teeth or cleats 32 for a purpose as will be hereinafter described.

When the runners are fitted to the wheels of a vehicle as herein described, it is apparent that each runner is connected to the adjacent wheel by the clip 4, and is also held rigidly in place by the braces 8, wherefore the wheel cannot turn when the vehicle is driven ahead, and therefore the vehicle will slide along upon the runners in the manner of an ordinary sled. As the front runners are connected to the front axle, said runners will turn with the axle and thereby permit of a convenient guiding of the vehicle.

To use the brake, the hand lever 27 is swung forwardly, and through the medium of the connecting rod 26, crank arm 27, rock bar 23, crank arm 22, link 21 and lever 19, the plunger 17 will be forced downwardly against the roadway so as to effectually check the movement of the vehicle in a forward direction as well as in a rearward direction.

When the runners are not required for use, the several brace chains are disconnected from the runners, the several set screws 16 are backed out of the threaded openings in the heads 9, and the brake links 21 are detached from the rear runners, whereupon the vehicle is driven forward, whereby the runners tilt downwardly and forwardly until the teeth or cleats 32 bite into the roadway, and as the wheels continue to rotate on the roadway the runners rotate with the wheels until the rear runners are at the tops of the wheels, this movement of the runners being permitted by reason of the fact that the bands 13 rotate upon the heads 9. When the rear runners have come into an upper position, one of the braces 8 is engaged with a clip 33 provided upon the adjacent side of the vehicle body, and the set screw 16 is replaced, whereby the runner is held in an elevated position. It will of course be understood that the clip 4 is disengaged from the wheel, in order that the wheel may freely rotate without interference by the runner.

The front runners are carried over until they come into an upright position at the front of the wheel and until one of the braces 8 engages with the hooked end 34 of a brace 35 extending from the tongue or pole of the vehicle. The front chain 28 is then reëngaged with the front runner and the clip 4 is released from the wheel. In this inoperative position of the front runners, the wheels may rotate as usual and the axle may be turned for guiding the vehicle without any interference on the part of the front runners because the runners are carried by the axle and swing therewith.

From the foregoing description it will be understood that the present invention is an attachment to a vehicle and is complete in itself and may be readily fitted to any ordinary vehicle without requiring any change therein beyond adding thereto the several parts of the device.

When the runners are not in use the brace chains may be hooked up beneath the bottom of the vehicle in any suitable manner, and each link 21 may be held up beneath the body of the vehicle in a hook or other suitable device 36 provided upon the bottom of the vehicle.

What is claimed is:—

1. The combination with a wheeled vehicle, of a head fixed upon the axle and provided with an annular groove, a band in the groove and rotatable around the head, a wheel runner, a brace between the runner and the band, and locking means between the band and head to prevent rotation of the band in the operative and inoperative positions of the runner.

2. The combination with a wheeled vehicle, of a wheel runner, means to connect the runner to the axle of the vehicle and permitting of the runner being brought into operative and inoperative positions, the front end of the runner being inclined upwardly to fit against a wheel, a wheel clamp carried by the upwardly-inclined front end of the runner and adapted to detachably embrace the felly of the wheel, a brake plunger working through a vertical opening in the rear end portion of the runner, a bell crank lever fulcrumed upon the runner with one end connected to the brake plunger, and means connected to the other end of the bell crank lever for actuating the brake plunger.

In testimony whereof I affix my signature in presence of two witnesses.

WILLIAM PASSARELLA.

Witnesses:
JAMES A. GORMAN,
PEARL ZICKLER.

Copies of this patent may be obtained for five cents each, by addressing the "Commissioner of Patents, Washington, D. C."